United States Patent
Alme et al.

(10) Patent No.: US 11,301,564 B2
(45) Date of Patent: *Apr. 12, 2022

(54) DECISION FOREST COMPILATION

(71) Applicant: McAfee, LLC, San Jose, CA (US)

(72) Inventors: Christoph Alme, Paderborn (DE); Joachim Gehweiler, Paderborn (DE); Oliver Helge Marquardt, Paderborn (DE)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,251

(22) Filed: Mar. 28, 2019

(65) Prior Publication Data
US 2019/0220595 A1 Jul. 18, 2019

Related U.S. Application Data

(63) Continuation of application No. 14/929,267, filed on Oct. 31, 2015, now Pat. No. 10,296,742.

(51) Int. Cl.
*G06F 21/00* (2013.01)
*G06F 21/56* (2013.01)
(Continued)

(52) U.S. Cl.
CPC .......... *G06F 21/56* (2013.01); *G06F 16/2246* (2019.01); *G06F 16/285* (2019.01); *G06F 21/564* (2013.01)

(58) Field of Classification Search
CPC .......... G06F 21/56; G06F 21/561–565; G06F 17/30598; G06F 17/30327; H04L 63/14;
(Continued)

(56) References Cited

U.S. PATENT DOCUMENTS 5,987,610 A 11/1999 Franczek et al.
6,009,199 A 12/1999 Ho
(Continued)

FOREIGN PATENT DOCUMENTS

WO 2017074602 A1 5/2017

OTHER PUBLICATIONS

Mohammed S. Alam and Son T. Vuong, "Random Forest Classification for Detecting Android", Department of Computer Science, University of British Columbia, 2013 IEEE International Conference on Green Computing and Communications and IEEE Internet of Things and IEEE Cyber Physical and Social Computing (Year: 2013).*

(Continued)

*Primary Examiner* — Joseph P Hirl
*Assistant Examiner* — Chi D Nguy
(74) *Attorney, Agent, or Firm* — Patent Capital Group

(57) ABSTRACT

There is disclosed in one example a computing apparatus, including: a processor; and a memory having encoded therein executable instructions to instruct the processor to: divide a file-under-analysis into a plurality of features; build a plurality of categories from the plurality of features, including a category of unrelated features; construct a first decision tree from a first category of the plurality of features, the first category including related features; construct a second decision tree from a second category of the plurality of features, the second decision tree including unrelated features; and determine, based at least partly on the first decision tree and the second decision tree, that the file under analysis has malware content.

11 Claims, 7 Drawing Sheets

(51) Int. Cl.
*G06F 16/28* (2019.01)
*G06F 16/22* (2019.01)

(58) Field of Classification Search
CPC ............. H04L 63/1408; H04L 63/1416; H04L 63/1425
See application file for complete search history.

(56) References Cited

U.S. PATENT DOCUMENTS

| | | | |
|---|---|---|---|
| 6,073,142 | A | 6/2000 | Geiger et al. |
| 6,460,050 | B1 | 10/2002 | Pace et al. |
| 7,506,155 | B1 | 3/2009 | Stewart et al. |
| 7,873,947 | B1 | 1/2011 | Lakhotia et al. |
| 8,528,087 | B2 | 9/2013 | Hsu et al. |
| 9,940,459 | B1 * | 4/2018 | Saxe .................. G06F 21/564 |
| 2007/0240217 | A1 * | 10/2007 | Tuvell .................. G06F 21/565 726/24 |
| 2011/0271146 | A1 | 11/2011 | Mork et al. |
| 2012/0323829 | A1 | 12/2012 | Stokes et al. |
| 2014/0090061 | A1 | 3/2014 | Avasarala et al. |
| 2017/0124325 | A1 | 5/2017 | Alme et al. |

OTHER PUBLICATIONS

John, George H., et al., "Irrelevant Features and the Subset Selection Problem", Machine Learning Proceedings 1994, Proceedings of the Eleventh International Conference, Rutgers University, New Brunswick, NY, Jul. 10-13, 1994, pp. 121-129.

PCT Dec. 28, 2016 International Search Report and Written Opinion in International Application No. PCT/US2016/052392; 11 pages.

Yusoff, Mohd Najwadi, et al., "Optimizing Decision Tree in Malware Classification System by using Genetic Algorithm," International Journal on New Computer Architectures and Their Applications (IJNCAA), vol. 1, No. 3, pp. 694-713, The Society of iDigital Information and Wireless Communications, Oct. 2011 (ISSN: 2220-9085), 20 pages.

* cited by examiner

DECISION FOREST COMPILATION

CROSS REFERENCE TO RELATED APPLICATIONS

This Application is a continuation of, and claims priority to, U.S. application Ser. No. 14/929,267, filed Oct. 31, 2015, entitled "Decision Forest Compilation." The disclosure of U.S. application Ser. No. 14/929,267 is considered part of, and as incorporated by reference in, the disclosure of this application.

FIELD OF THE SPECIFICATION

The present disclosure is directed to the field of computer security, and, more particularly, to defining interrelationships between features in a decision forest.

BACKGROUND

A random forest can be considered a mechanism by which decision trees are formed. Random forest decision mechanisms have been an effective solution for computer security systems in that random forests are characterized by a combination of being both reasonably generic and accurate. Random forests are additionally fast to compile at runtime, in that the decision trees needs to only be interpreted once.

The problem with a random forest is the randomness— random forests treat all attributes equally and do not incorporate interrelationships between these attributes. As a result, random forest is a sub-optimum solution for use in malware detection.

SUMMARY

In an example, there is disclosed a computing apparatus, comprising: a processor; and a memory having encoded therein executable instructions to instruct the processor to: divide a file-under-analysis into a plurality of features; build a plurality of categories from the plurality of features, including a category of unrelated features; construct a first decision tree from a first category of the plurality of features, the first category comprising related features; construct a second decision tree from a second category of the plurality of features, the second decision tree comprising unrelated features; and determine, based at least partly on the first decision tree and the second decision tree, that the file under analysis has malware content.

Embodiments of the Disclosure

The present disclosure describes defining interrelationships between the features to be used in the decision forest's decision trees. The trees can be configured to incorporate known relationships or dependencies. In addition or in the alternative, know relationships or dependencies can be deliberately and/or selectively ignored if appropriate for a particular use case. Incorporating the relationships between the features considered in the trees allows for an improvement to the overall accuracy and configurability of these decision trees.

When assessing a given file for malware, one approach is to use a decision tree that incorporates several branches (or decisions), each representing a feature or file characteristic of interest in the malware assessment. Such features may include, as examples, the file size, entropy, presence of special key words, presence of I-Frame tags in HTML code, malicious Javascript code, among a multitude of other examples (including features that could be added to the set in the future). This disclosure describes using multiple different trees, each tree being used to assess the same file and resulting in a vote or score indicating the probability of whether the file is malware or not. The multiple scores from each decision tree are then aggregated and processed (e.g., using a Bayesian sum) to determine an overall decision regarding whether the file is malware.

The present disclosure describes a decision forest mechanism that can use a multi-tree approach and where each decision tree includes features that are related or interdependent. The present disclosure describes defining a set of features to be used in decision trees and to identify or define relationships between some of these features.

Figure 1:
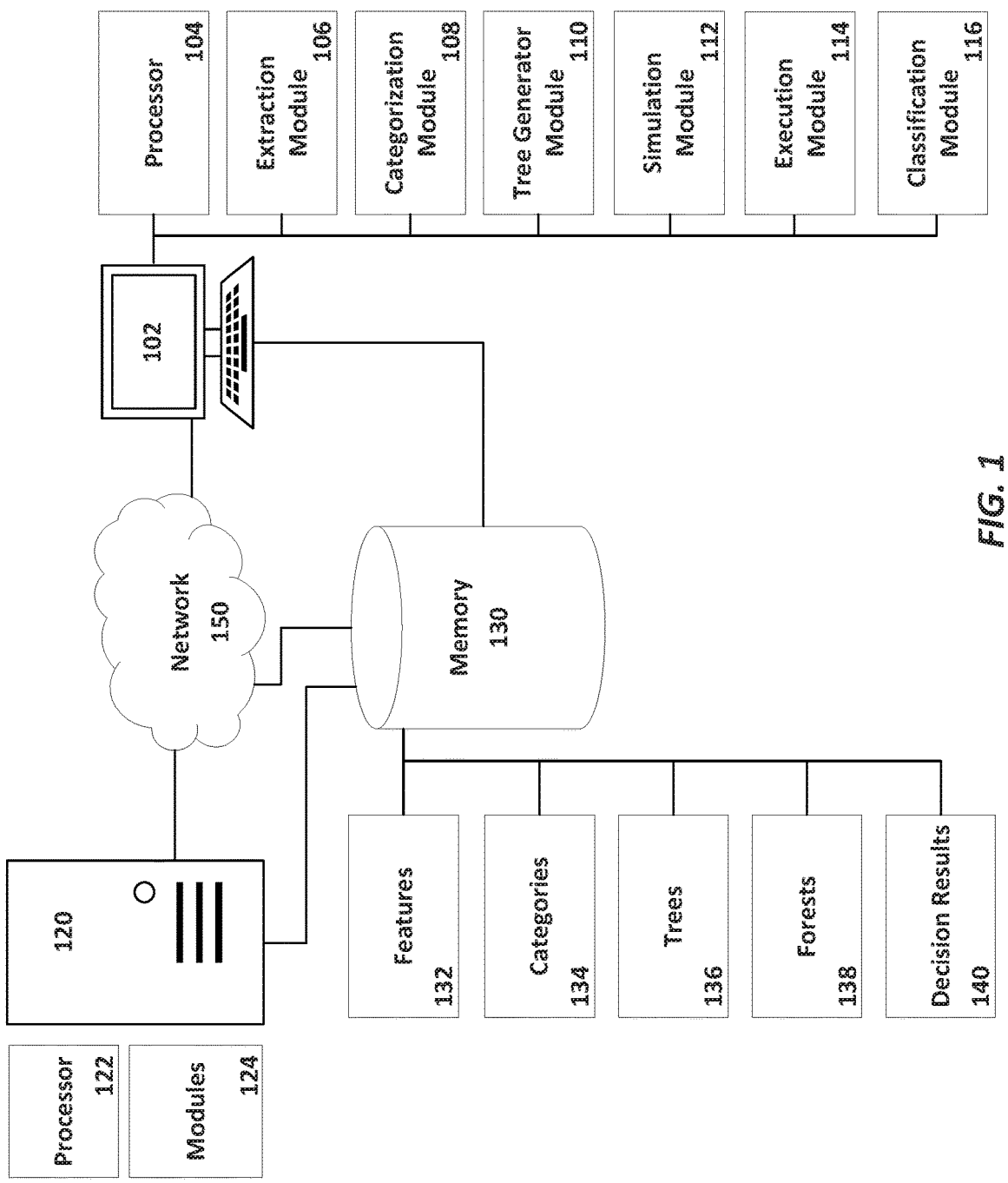
FIG. 1 is a schematic diagram of a system for detecting malware in a file in accordance with embodiments of the present disclosure.

FIG. 1 is a schematic diagram of a system 100 for detecting malware in a file in accordance with embodiments of the present disclosure. System 100 includes a user device 102, which can be a computer, tablet, smart phone, or other computing or telecommunications device. The user device 102 includes a processor 104, which can be implemented at least partially in hardware. The user device 102 also includes a memory 122. Memory 130 may be a local memory or may be a memory accessible across a network 150. Memory 130 can store features 132 extracted from files, categories 134, decision trees 136, and decision forests 138. Memory 130 can also store decision results 140, which can include results from each decision tree in a decision forest and aggregated results from all of the decision trees in a decision forest.

The use device 102 can also include one or more modules, which can be hardware logic, software logic, or a combination of hardware and software (e.g., a hardware processor and hardware memory can execute program code). In some cases, the modules can be implemented at least partially in hardware, the hardware including a hardware processor, such as processor 104.

In some embodiments, user device 102 can include an extraction module 106 (which can include extraction logic) to extract one or more features from a file (e.g., a file received across network 150, such as an e-mail attachment or a download). The extraction module 106 can analyze the incoming file to identify one or more features of the file. In some embodiments, the extraction module 106 can identify features by calling a simulation module 112. Simulation module 112 (which can include simulation logic) can run a simulation of a run-time environment for the file to identify features associated with the file, such as file size, file type, as well as network addresses the file access, programs the file calls, etc. Results from the simulation module 112 are used for random tree/forest creation.

In some embodiments, the user device 102 can include a categorization module 108 (which can include categorization logic) to associate each of the one or more features with one or more categories. Memory 130 can store features 132 that are extracted from files and categories 134 that can include associations with features 132 based on how the features are related or interdependent. For example, two features can be associated with a category if the two features are related to each other (e.g., each feature pertains to file size or file type). The category the two features is associated with is descriptive of the relationship between the features. Each feature can be associated with one or more categories.

In some embodiments, the categorization module can also create categories for extracted features based on how the features are not related. In some embodiments, the categorization module can augment categories of related features with additional, unrelated features.

In some embodiments, the categorization module 108 is operable to identify a relationship between each of the one or more features of the file. Relationships can be identified by comparing each feature with a table or other predetermined basis. The categorization module is also operable to identify one or more categories for each of the one or more features based on the relationship between each feature. A relationship can also be identified by associating a feature with a category, and each feature associated with the same category can be considered to be related.

The categorization module 108 can also categorize unrelated features into the same category to define a category of unrelated features.

The categorization module 108 can also augment categories of related features with unrelated features or features from other categories. In some implementations, the tree generator module can augment trees generated based on categories with additional branches using unrelated features (i.e., features not present in the category used to generate the decision tree).

In some embodiments, user device 102 can include a tree generator module 110 (which may include tree generator logic) that uses the categories and features to build decision trees. In some embodiments, the tree generator module 110 uses a category as the basis behind a decision tree. In that case, the features that make up the decision branches of the decision tree are all associated with the corresponding category. The decision tree, therefore, can include branches that are interrelated or interdependent.

In some embodiments, the decision tree can be populated with features from a single category, and augmented with features from another category (i.e., either a similar or dissimilar category). The decision tree can also include branches having varying degrees of interdependency, from "closely related" to "somewhat related" to "unrelated."

The user device 102 can include an execution module 114 (which may include execution logic) to execute the decision trees 136 (e.g., or trees that make up a decision forest 138) to generate a first decision result 140. For example, the execution module 114 can execute a first and second decision tree to generate a first and second decision result. A classification module 116 (which can include classification logic) can determine whether the file has malware based on the first decision result and the second decision result. For example, each decision tree can result in a vote or score indicating the probability of whether the file is malware or not. The multiple scores from each decision tree can then be aggregated and processed (e.g., using a Bayesian sum) to determine an overall decision regarding whether the file is malware.

The system 100 may also include a server 120 that can include the same or similar modules as the user device 102 that operate in the same or similar fashion as described above. The user device 102 can access modules running on server 120 across network 150 to test files for malware. The server 120 can include a memory 130 that is local or accessible across a network 150. The user device 102 can access remote applications or cloud based applications across network 150 that are run on server 120. Server 120 can include a processor 122 that is implemented at least partially in hardware. The processor 122 can execute instructions received from user device 102 across network 150. Processor 122 run modules 124, which can include any combination of the extraction module 106, categorization module 108, tree generator module 11, simulation module 112, execution module 114, and classification module 116.

Figure 2:
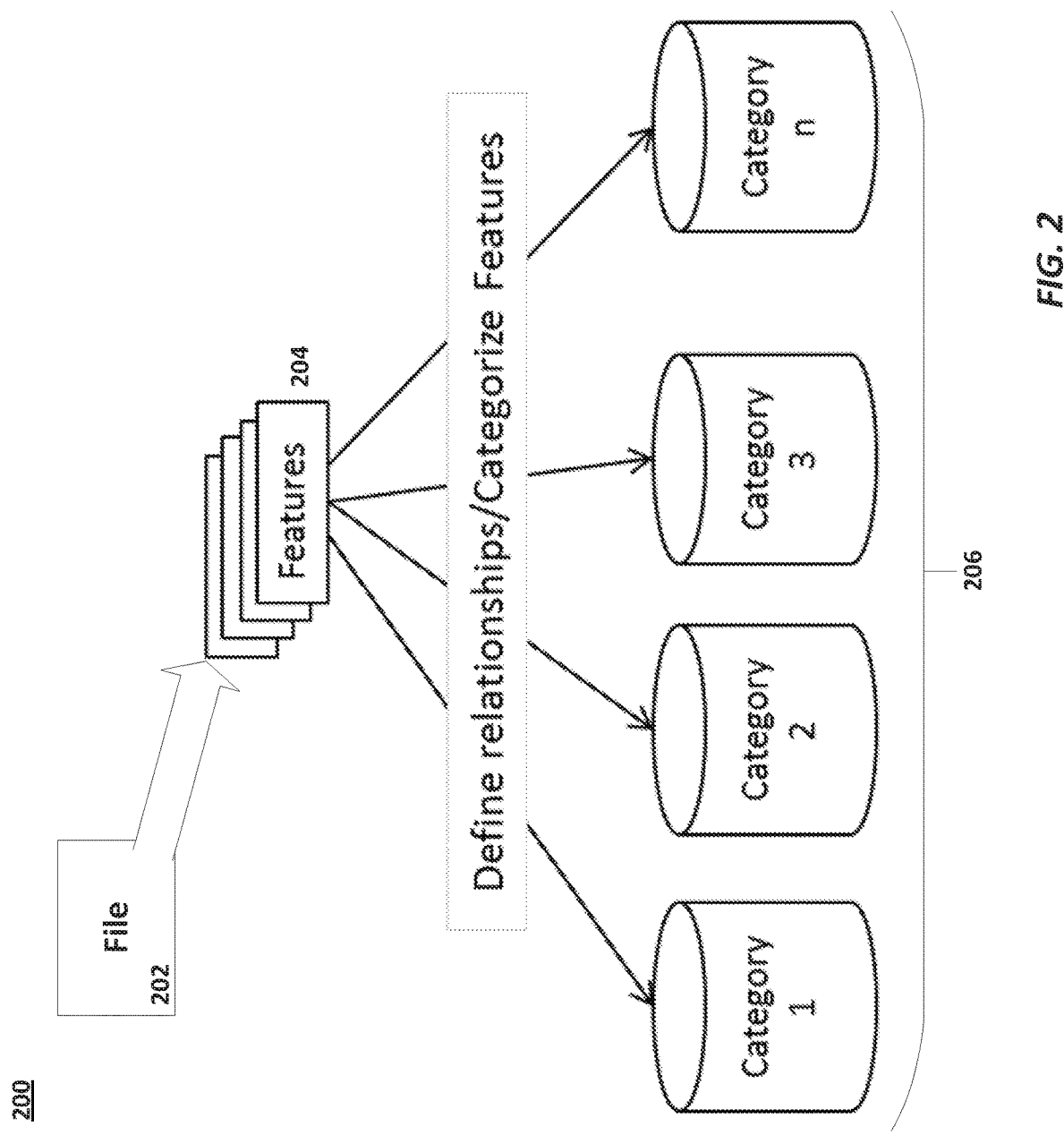
FIG. 2 is a schematic diagram of features of a file categorized into one or more categories in accordance with embodiments of the present disclosure.

FIG. 2 is a schematic diagram 200 of features of a file categorized into one or more categories in accordance with embodiments of the present disclosure. A file 202 can be received by a user device across a network, such as a downloaded file or an e-mail attachment. Features 204 of the file can be extracted. Each feature can be associated with or assigned to a category 206, such as category 1 through category n for "n" number of categories.

The features 202 of the file can be categorized based on their similarity. For instance, categories of features can be defined, such as semantic, geometric, behavioral features, etc. Data structures can be defined to map attributes according to these relationships (e.g., using a Markov chain). This definition of relationships can then be used during compilation of the decision trees to be included in a forest of decision trees for use during malware assessment based on the relative degree of relationships between the parent's (or previously selected branch's) feature and the feature(s) that is to be used in the subsequent (or child) branches.

For example, a first feature can be the number of readable strings in the file and a second feature can be the entropy of a file. These example features are related, so both would be associated with the same category.

Figure 3:
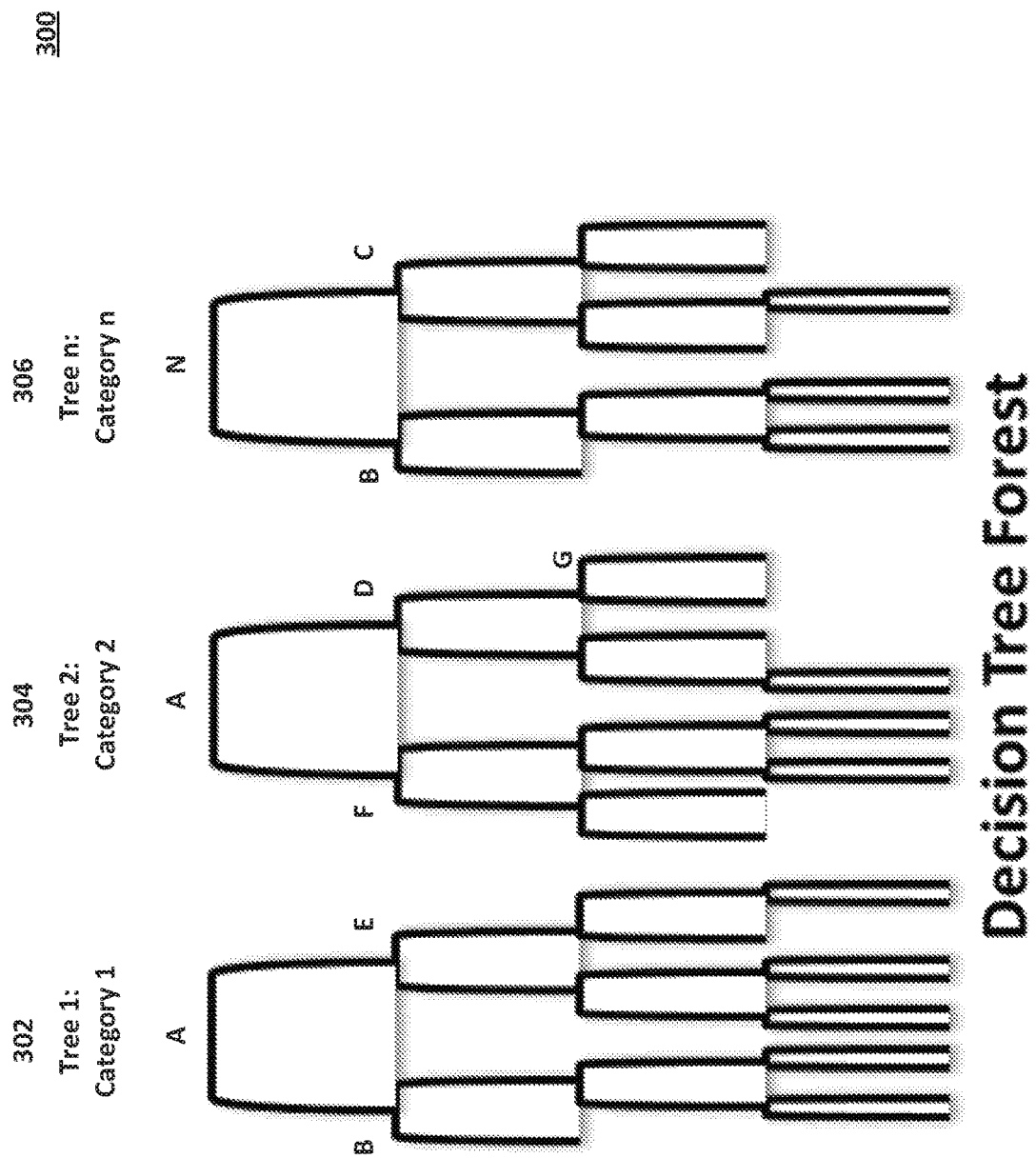
FIG. 3 is a schematic diagram of a decision tree forest in accordance with embodiments of the present disclosure.

FIG. 3 is a schematic diagram of a decision forest 300 in accordance with embodiments of the present disclosure. Decision forest 300 includes decision trees associated with one or more categories. For example, decision forest 300 includes decision tree 1 302 associated with category 1, decision tree 2 304 associated with category 2, and decision tree n 306 associated with category n, e.g., for n categories.

Decision tree 1 302 includes a parent branch A that is representative of a feature and child branches B and E. The features A and B and E can be selected from a set of features that make up the category 1. In some embodiments, feature A is selected such that the first decision reduces the number of child branches by a relatively large number. For example, a file size can be selected at a half-way point between typical file sizes. If feature A is "file size," a file size decision can be "below X bytes" and "equal to or above X bytes," where X is the half-way point previously determined. Such a feature would reduce the potential results by approximately half, which can reduce the total number of branches required to traverse before reaching the end of the decision tree.

In some embodiments, each branch of a decision tree is related to other branches. For example, in decision tree 1 302, feature A that makes up a parent branch is related to feature B and feature E, which make up child branches to feature A. Features B and E may also be related. The degree to which a child branch is related to its parent is configurable prior to compilation. An administrator or developer can select that one or more (or all) of the trees in a given forest consider the defined degrees of relation between features when building the tree (i.e., determining the next child branch for each parent).

If a more generic tree is desired, the tree generator selects child features with a closer relation to the feature of the parent. For example, feature N of decision tree n can be from the same category as features B and C.

If more accurate trees are desired, the tree generator is to select child features (branching from a given parent feature) with a greater distance of relation (e.g., from a different category of features) of the parent. For example, feature A of decision tree 2 304 maybe associated with a different category than feature F.

A decision tree can also include a mix of related and unrelated features. For example, decision tree 2 can include feature A that is related to feature D (i.e., A and D are both associated with category 2), and decision tree 2 can include features F and G, both of which are associated with a different category than features A and D.

The number of decision trees generated is defined by an administrator. As an example, the number of categories can equal the number of decision trees; or, a specific number of decision trees can be generated based on preferences, accuracy targets, etc. Using this platform, optimal tree formats can be determined for delivering accuracy in malware detection. This optimization can be accomplished through a separate process (e.g., by the simulation module 112) that iterates through each possible tree permutation of features to determine which tree configuration(s) deliver the most accurate results (e.g., based on assessments of test "clean" and "dirty" files). This iterative process would be a resource-intensive exercise as the number of permutations can be very large, but because these relationships do not generally change over the short term, such an exercise would be rare (e.g., yearly, bimonthly, etc.). A heuristic analysis could be performed to determine a subset of the universe of potential forest permutations that are most likely to be the most accurate, and the test would be run against this subset to determine which of the trees (and tree combinations) yields the most accurate results with the set of features we utilize. Regardless of the method, the optimized forest could then be used as a baseline of the most accurate forest. In embodiments where accuracy is desired, this baseline can be applied in compiling the forest to be used.

In other cases, where generic results are desirable, a baseline can be determined and used that attempts to develop trees with less "distance" between the parent and child branches.

Figure 4:
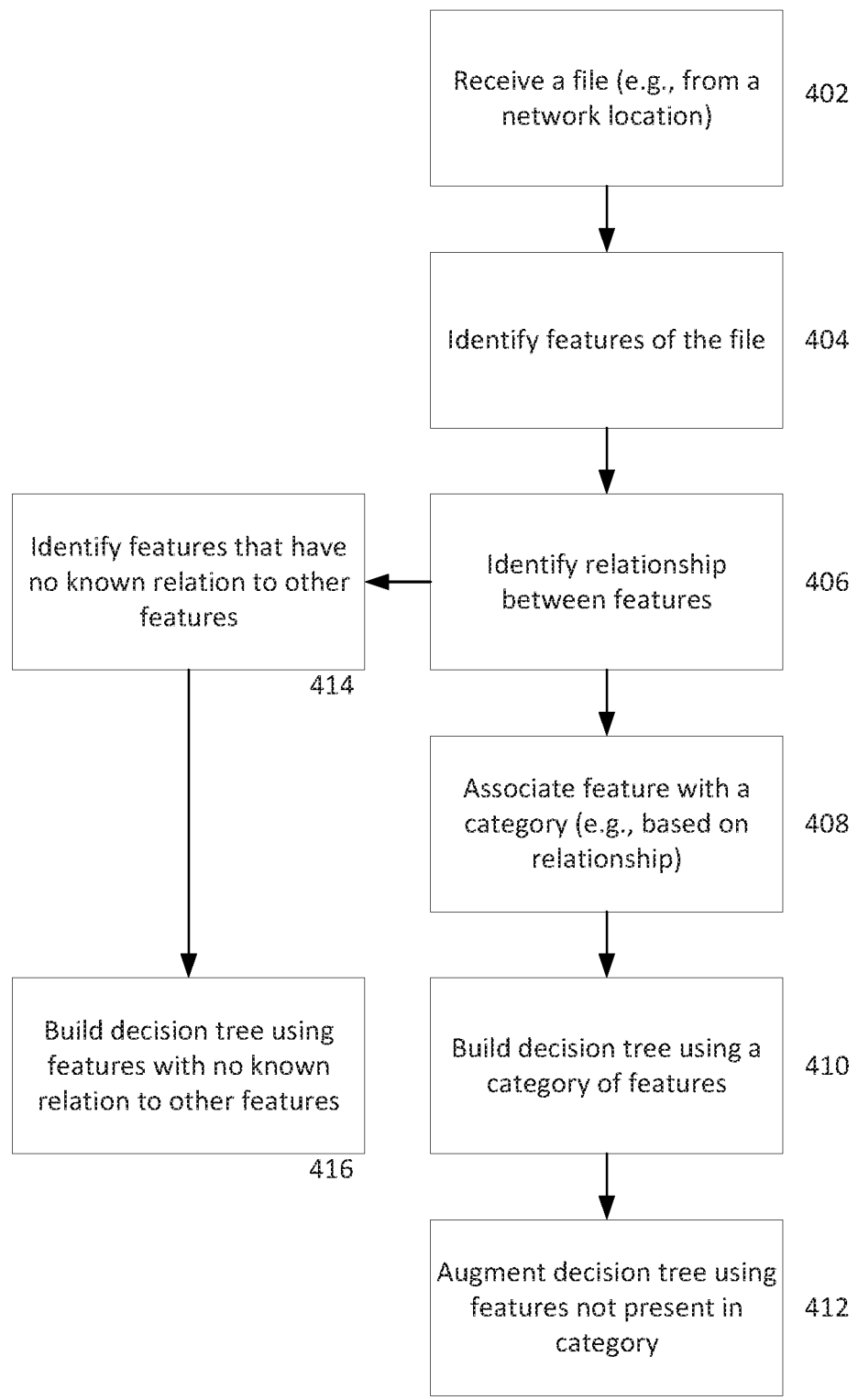
FIG. 4 is a process flow diagram for defining a decision tree in accordance with embodiments of the present disclosure.

FIG. 4 is a process flow diagram 400 for defining a decision tree in accordance with embodiments of the present disclosure. A user device can receive a file (e.g., from a network location, via a download or e-mail) (402). The user device can identify and extract features of the file (404). The features can be any type of features that provide information about the file, such as file size, file type, file structure, compression, file source (where the file came from), who sent the file, types of programs that can run the file, behavior while simulating the file content, entropy, number of bit strings, what resources the file will call upon, what networked locations that file accesses, etc.

In some embodiments, the features are associated with one or more categories (408). Each feature can be predetermined to be associated with one or more categories. And features associated with the same category can be said to be related. In some embodiments, a category can be defined so that features associated with that category are unrelated.

In some embodiments, the user device can identify relationships between features (406). This identification can be based on a predetermined relationship between known features. For example, if features include file entropy and the number of bit strings, the user device can cross reference a predetermined table or database or use other identifiers to relate the features.

Table 1 shows how identified features can be associated with categories:

TABLE 1

Feature associations with categories.

| | | | | | | |
|---|---|---|---|---|---|---|
| Feature A | Cat 1 | Cat 2 | Cat 6 | Cat 10 | → | Cat 20 |
| Feature B | Cat 1 | Cat 3 | Cat 8 | Cat 11 | | |
| Feature C | Cat 4 | | | | → | Cat 20 |
| Feature D | Cat 1 | Cat 2 | Cat 10 | | | |

Table 1 shows how features A-D can be associated with categories. For example, when user device identifies feature A, the user device can consult a predefined association matrix to identify categories for feature A. In this case, Feature A can be associated with Categories 1, 2, 6, 10, and 20. Likewise, Feature B can be associated with Categories 1, 3, 8, and 11. Feature A and Feature B, therefor can be considered to be related (because they are both associated with Category 1; however, Feature A and Feature B may be considered only "somewhat" related because Features A and B are only associated with one overlapping category (Category 1). By contrast, Features A and D may be considered more related because Features A and D are associated with three overlapping categories (Categories 1, 2, and 10).

In some embodiments, unrelated features can be associated with a category. For example, Feature A and Feature C do not overlap categories, so the user device can consider Features A and C to be unrelated. The user device can the can associate Features A and C with Category 20, which is reserved for unrelated features.

The user device can build decision trees based on the features from the categories (410). A plurality of decision trees constitutes a decision forest. Each tree can be representative of a category of related features, so that the branches of each tree are related or interdependent. In some embodiments, a decision tree can be populated by unrelated features. In some embodiments, a decision tree that includes related features can be augmented with one or more unrelated features (i.e., features that are associated with a different category than that used to generate the decision tree) (412).

In some embodiments, one or more features can be extracted and identified that have no known relation to other features (e.g., unrelated features) (414). A decision tree can be built using features that have no known relation to other features (416). The decision forest can be compiled using decision trees built from categories of related features (and, in some cases augmented with unrelated features) and, in some cases, from decision trees built from features that have no known relation.

Figure 5:
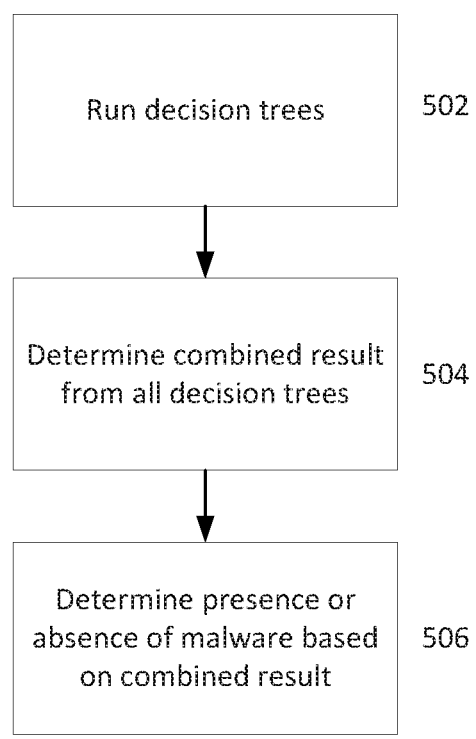
FIG. 5 is a process flow diagram for executing one or more decision trees to determine the presence or absence of malware in a file in accordance with embodiments of the present disclosure.

FIG. 5 is a process flow diagram 500 for executing one or more decision trees to determine the presence or absence of malware in a file in accordance with embodiments of the present disclosure. A user device can execute each decision tree of a decision forest (502). The user device can ascertain a result for each decision tree (504). The user device can determine the presence or absence of malware based on a combined result from each decision tree in the decision forest (506).

For example, each decision tree can result in a vote or score indicating the probability of whether the file is malware or not. The multiple scores from each decision tree can then be aggregated and processed (e.g., using a Bayesian sum) to determine an overall decision regarding whether the file is malware.

Figure 7:
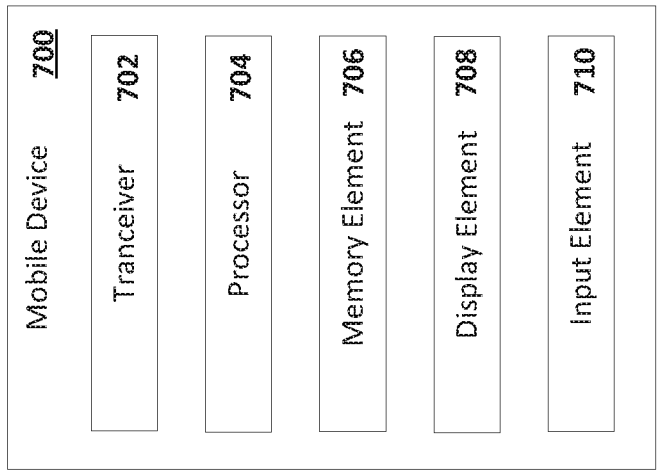
FIG. 7 is a schematic block diagram of a mobile device in accordance with embodiments of the present disclosure.
Figure 6:
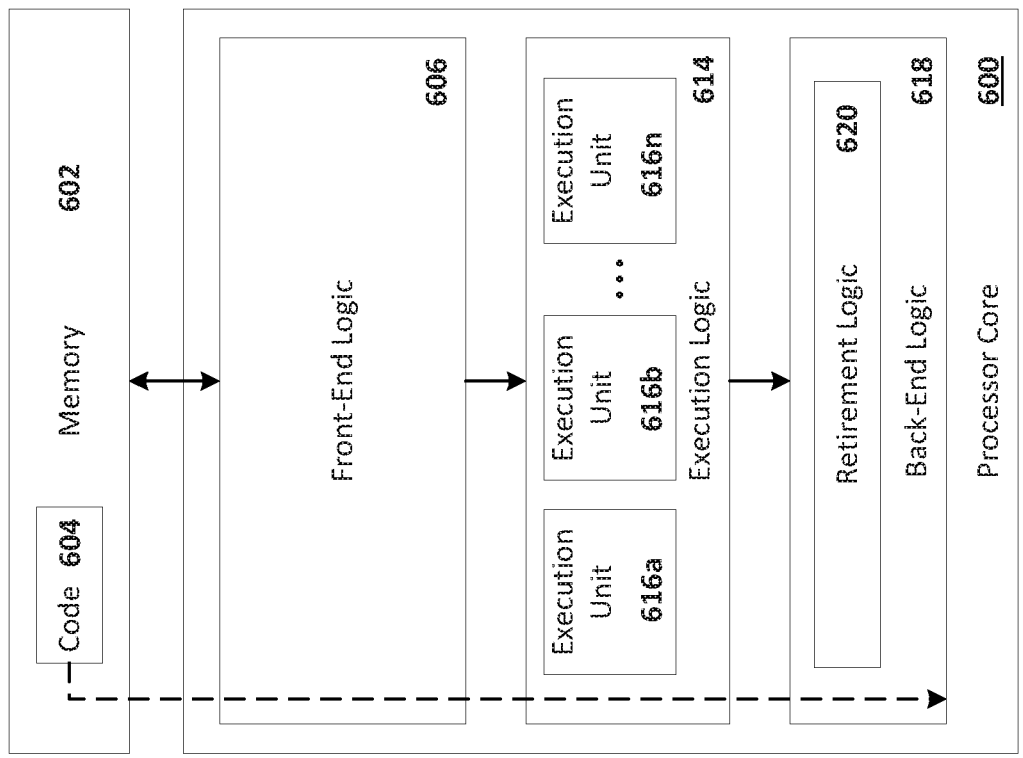
FIG. 6 is an example illustration of a processor according to an embodiment of the present disclosure.
Figure 8:
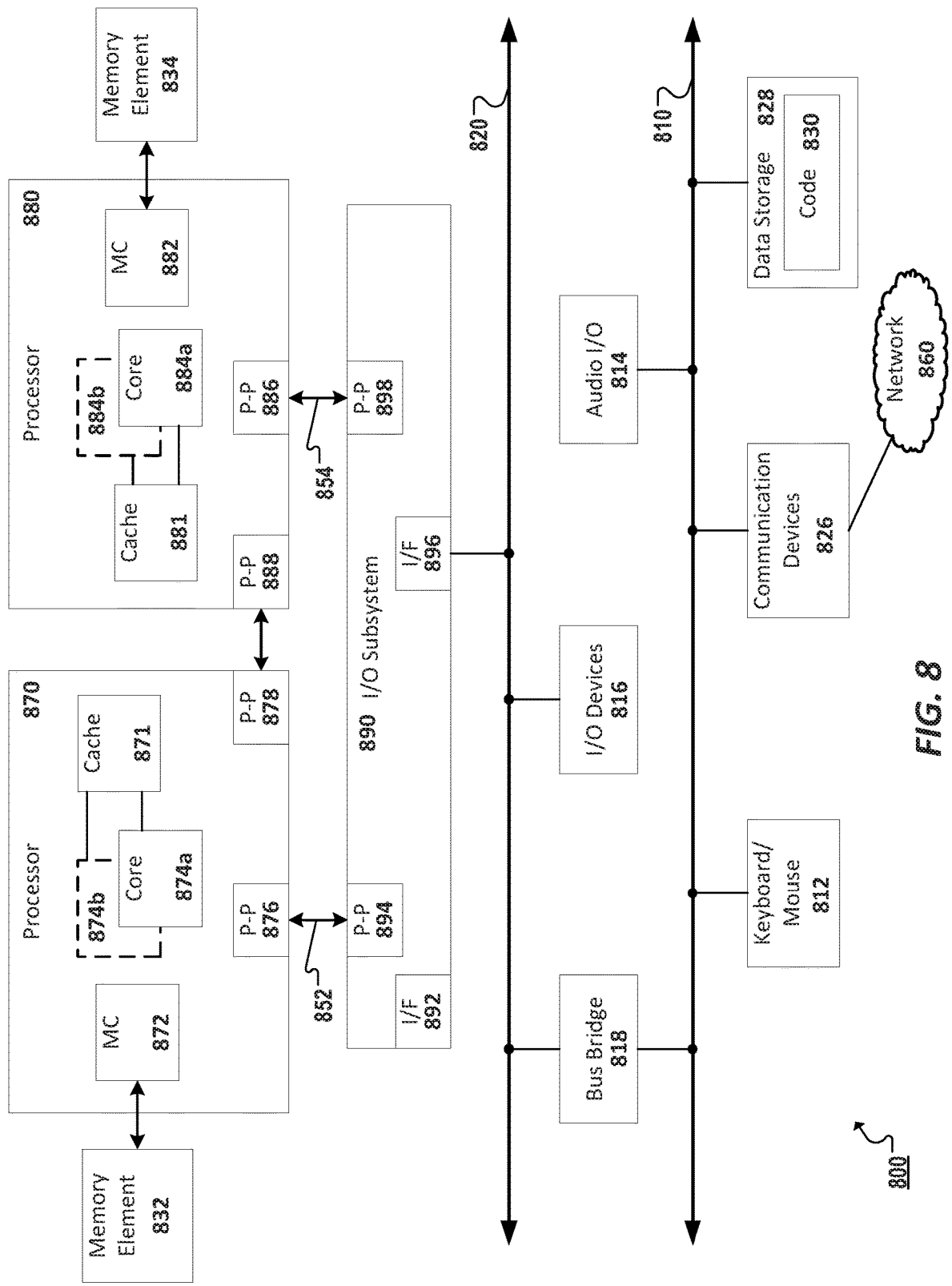
FIG. 8 is a schematic block diagram of a computing system according to an embodiment of the present disclosure.

FIGS. 6-8 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 6-8.

FIG. 6 is an example illustration of a processor according to an embodiment. Processor 600 is an example of a type of hardware device that can be used in connection with the implementations above.

Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Referring now to FIG. 7, a block diagram is illustrated of an example mobile device 700. Mobile device 700 is an example of a possible computing system (e.g., a host or endpoint device) of the examples and implementations described herein. In an embodiment, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 700 illustrated in FIG. 7 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 702 is connected to a processor 704, which may perform the bulk of the digital signal processing of signals to be communicated and signals received, at the baseband frequency. Processor 704 can provide a graphics interface to a display element 708, for the display of text, graphics, and video to a user, as well as an input element 710 for accepting inputs from users, such as a touchpad, keypad, roller mouse, and other examples. Processor 704 may include an embodiment such as shown and described with reference to processor 600 of FIG. 6.

In an aspect of this disclosure, processor 704 may be a processor that can execute any type of instructions to achieve the functionality and operations as detailed herein. Processor 704 may also be coupled to a memory element 706 for storing information and data used in operations performed using the processor 704. Additional details of an example processor 704 and memory element 706 are subsequently described herein. In an example embodiment, mobile device 700 may be designed with a system-on-a-chip (SoC) architecture, which integrates many or all components of the mobile device into a single chip, in at least some embodiments.

FIG. 8 is a schematic block diagram of a computing system 800 according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Example Implementations

There is disclosed in one example a computing apparatus, comprising: a processor; and a memory having encoded therein executable instructions to instruct the processor to divide a file-under-analysis into a plurality of features; build a plurality of categories from the plurality of features, including a category of unrelated features; construct a first decision tree from a first category of the plurality of features, the first category comprising related features; construct a second decision tree from a second category of the plurality of features, the second decision tree comprising unrelated features; and determine, based at least partly on the first decision tree and the second decision tree, that the file under analysis has malware content.

There is further disclosed an example computing apparatus, wherein determining that the file under analysis has malware content comprises executing the first decision tree and the second decision tree.

There is further disclosed an example computing apparatus, wherein building the plurality of categories comprises identifying a relationship between a plurality of features of the file, and identifying one or more categories for the features based on the identified relationship.

There is further disclosed an example computing apparatus, wherein building the plurality of categories comprises categorizing related features into a common category to define a category of related features.

There is further disclosed an example computing apparatus, wherein building the plurality of categories comprises categorizing unrelated features into a single unrelated features category.

There is further disclosed an example computing apparatus, wherein building the plurality of categories comprises associating each of the plurality of features with one or more categories.

There is further disclosed an example computing apparatus, wherein constructing the first decision tree comprises augmenting the first decision tree with a feature from the unrelated features category.

There is further disclosed an example computing apparatus, wherein building the plurality of categories comprises augmenting one or more predefined categories with one or more features of the file.

There is also disclosed an example of one or more tangible, non-transitory computer-readable storage mediums having stored thereon executable instructions to instruct a processor to: receive a file; extract from the file a plurality of features; build a plurality of categories from the plurality of features, comprising grouping related features into one or more related categories, and identifying unrelated features for inclusion in a category of unrelated features; construct a first decision tree from at least one of the related categories; construct a second decision tree from the unrelated features category; and execute the first decision tree and second decision tree to identify malware content in the file.

There is further disclosed an example of one or more tangible, non-transitory computer-readable storage mediums, wherein building the plurality of categories comprises identifying a relationship between a plurality of features of the file, and identifying one or more categories for the features based on the identified relationship.

There is further disclosed an example of one or more tangible, non-transitory computer-readable storage mediums, wherein building the plurality of categories comprises categorizing related features into a common category to define a category of related features.

There is further disclosed an example of one or more tangible, non-transitory computer-readable storage mediums, wherein building the plurality of categories comprises categorizing unrelated features into a single unrelated features category.

There is further disclosed an example of one or more tangible, non-transitory computer-readable storage mediums, wherein building the plurality of categories comprises associating each of the plurality of features with one or more categories.

There is further disclosed an example of one or more tangible, non-transitory computer-readable storage mediums, wherein constructing the first decision tree comprises augmenting the first decision tree with a feature from the unrelated features category.

There is further disclosed an example of one or more tangible, non-transitory computer-readable storage mediums, wherein building the plurality of categories comprises augmenting one or more predefined categories with one or more features of the file.

There is also disclosed an example of a computer-implemented method of using decision forest compilation to identify malicious files, comprising: identifying a file for analysis; extracting a plurality of features from the file; synthesizing a plurality of categories from the plurality of features, comprising grouping related features into a plurality of related categories, and assigning unrelated features to a single unrelated category; constructing a plurality of related decision trees from the related categories; constructing an unrelated decision tree from the unrelated categories; and executing at least one of the related decision trees and the unrelated decision tree to determine whether the file includes malware content.

There is further disclosed an example of a method, wherein synthesizing the plurality of categories comprises identifying a relationship between a plurality of features of the file, and identifying one or more categories for the features based on the identified relationship.

There is further disclosed an example of a method, wherein synthesizing the plurality of categories comprises categorizing related features into a common category to define a category of related features.

There is further disclosed an example of a method, wherein synthesizing the plurality of categories comprises categorizing unrelated features into a single unrelated features category.

There is further disclosed an example of a method, wherein synthesizing the plurality of categories comprises associating each of the plurality of features with one or more categories.

There is further disclosed an example of a method, wherein constructing the plurality of related decision trees comprises augmenting at least one of the related decision trees with a feature from the unrelated features category.

There is further disclosed an example of a method, wherein synthesizing the plurality of categories comprises augmenting one or more predefined categories with one or more features of the file.

There is further disclosed an example apparatus comprising means for performing the method of a number of the above examples.

There is further disclosed an example apparatus, wherein the means for performing the method of a number of the above examples comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as claimed in a number of the above examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computing apparatus, comprising:
   a processor; and
   a memory having encoded therein executable instructions to instruct the processor to construct and analyze a decision forest, including instructions to
   divide a file-under-analysis into a plurality of features;
   identify a relationship between the plurality of features of the file-under-analysis;
   identify a plurality of categories for the plurality of features, based on the relationship, the plurality of categories including at least a first category of related features, and a second category of unrelated features that are unrelated to the related features;
   construct a first decision tree from the first category, wherein the first decision tree includes branches representing the related features;
   construct a second decision tree from the second category of unrelated features;
   aggregate the first and second decision trees into a decision forest;
   analyze the first decision tree to produce a first decision result, and analyze the second decision tree to produce a second decision result; and
   determine, based on the first decision result and the second decision result, that the file-under-analysis has malware content.

2. The computing apparatus of claim 1, the instructions further to execute the first decision tree and the second decision tree.

3. The computing apparatus of claim 1, wherein identifying the plurality of categories comprises associating each of the plurality of features with one or more of the plurality of categories.

4. The computing apparatus of claim 1, wherein constructing the first decision tree comprises augmenting the first decision tree with a feature from the second category of unrelated features.

5. The computing apparatus of claim 1, wherein identifying the plurality of categories comprises augmenting one or more predefined categories with one or more of the plurality of features of the file-under-analysis.

6. One or more tangible, non-transitory computer-readable storage mediums having stored thereon executable instructions to instruct a processor to:
   receive a file;
   extract from the file a plurality of features;
   identify a relationship between the plurality of features from the file;
   perform an identification of a plurality of categories for the plurality of features, based on the relationship, the identification comprising grouping related features into at least one or more related categories, and identifying unrelated features, unrelated to the related features, for inclusion in at least one or more categories of unrelated features;
   construct a first decision tree from the at least one or more related categories, wherein the first decision tree includes branches representing the related features;
   construct a second decision tree from the at least one or more categories of unrelated features;
   construct a decision forest from the first and second decision trees;
   inspect the first decision tree to produce a first decision result, and analyze the second decision tree to produce a second decision result; and
   based on the first decision result and the second decision result, identify malware content in the file.

7. The one or more tangible, non-transitory computer-readable storage mediums of claim 6, wherein the identification comprises associating each of the plurality of features with one or more of the plurality of categories.

8. The one or more tangible, non-transitory computer-readable storage mediums of claim 6, wherein constructing the first decision tree comprises augmenting the first decision tree with a feature from the one or more categories of unrelated features.

9. The one or more tangible, non-transitory computer-readable storage mediums of claim 6, wherein the identification comprises augmenting one or more predefined categories with one or more of the plurality of features of the file.

10. A computer-implemented method of using decision forest compilation to identify malicious files, comprising:
    identifying a file for analysis;
    extracting a plurality of features from the file;
    identifying a relationship between the plurality of features from the file;
    synthesizing a plurality of categories for the plurality of features, based on the relationship, the synthesizing comprising grouping related features into at least a related category of related features, and assigning unrelated features that are unrelated to the related features to an unrelated category;
    constructing at least a related decision tree from the related category, wherein the related decision tree includes branches representing the related features;
    constructing an unrelated decision tree from the unrelated features;
    aggregating the related and unrelated decision trees into a decision forest;
    performing a feature-wise analysis on the decision forest to produce a related decision result from the related decision tree and an unrelated decision result from the unrelated decision tree; and
    initiating at least one of the related decision tree and the unrelated decision tree to determine, based on the related decision result and the unrelated decision result, whether the file includes malware content.

11. The method of claim 10, wherein the synthesizing the plurality of categories comprises associating each of the plurality of features with one or more of the plurality of categories.

* * * * *